United States Patent
Takayanagi

[11] Patent Number: 6,160,630
[45] Date of Patent: Dec. 12, 2000

[54] IMAGE READING APPARATUS

[75] Inventor: Toshihiro Takayanagi, Okazaki, Japan

[73] Assignee: Brother Kogyo Kabushiki Kaisha, Nagoya, Japan

[21] Appl. No.: 09/078,567

[22] Filed: May 14, 1998

[30] Foreign Application Priority Data

May 16, 1997 [JP] Japan ..................................... 9-126599

[51] Int. Cl.[7] ................................. H04N 1/21; H02P 8/00
[52] U.S. Cl. ......................... 358/1.12; 358/296; 358/412; 318/696
[58] Field of Search ..................................... 358/498, 412, 358/413, 418, 401, 296, 1.12, 1.1, 1.15, 1.18, 1.8, 1.5; 318/696, 685; 347/16, 104, 215, 164, 162

[56] References Cited

U.S. PATENT DOCUMENTS 5,491,397 2/1996 Hirakawa ................................ 318/696

*Primary Examiner*—Cheukfan Lee
*Attorney, Agent, or Firm*—Oliff & Berridge, PLC

[57] ABSTRACT

An image reading apparatus for reading out images on an image carrying paper sheet is provided. The apparatus includes a motor for feeding the image carrying paper sheet. The motor is driven by a motor driving unit on the basis of motor controlling data. The image reading apparatus further includes a generator for generating the motor controlling data, a photoelectric converter for generating image signals corresponding to the images. The apparatus also includes a register for holding the motor controlling data from the motor controlling data generator. The motor controlling data held by the register are advantageously supplied to the motor driving unit after a predetermined delay time by way of a delay unit which includes a latch circuit for holding the motor controlling data from the register, and a counter associated with the latch circuit.

14 Claims, 5 Drawing Sheets

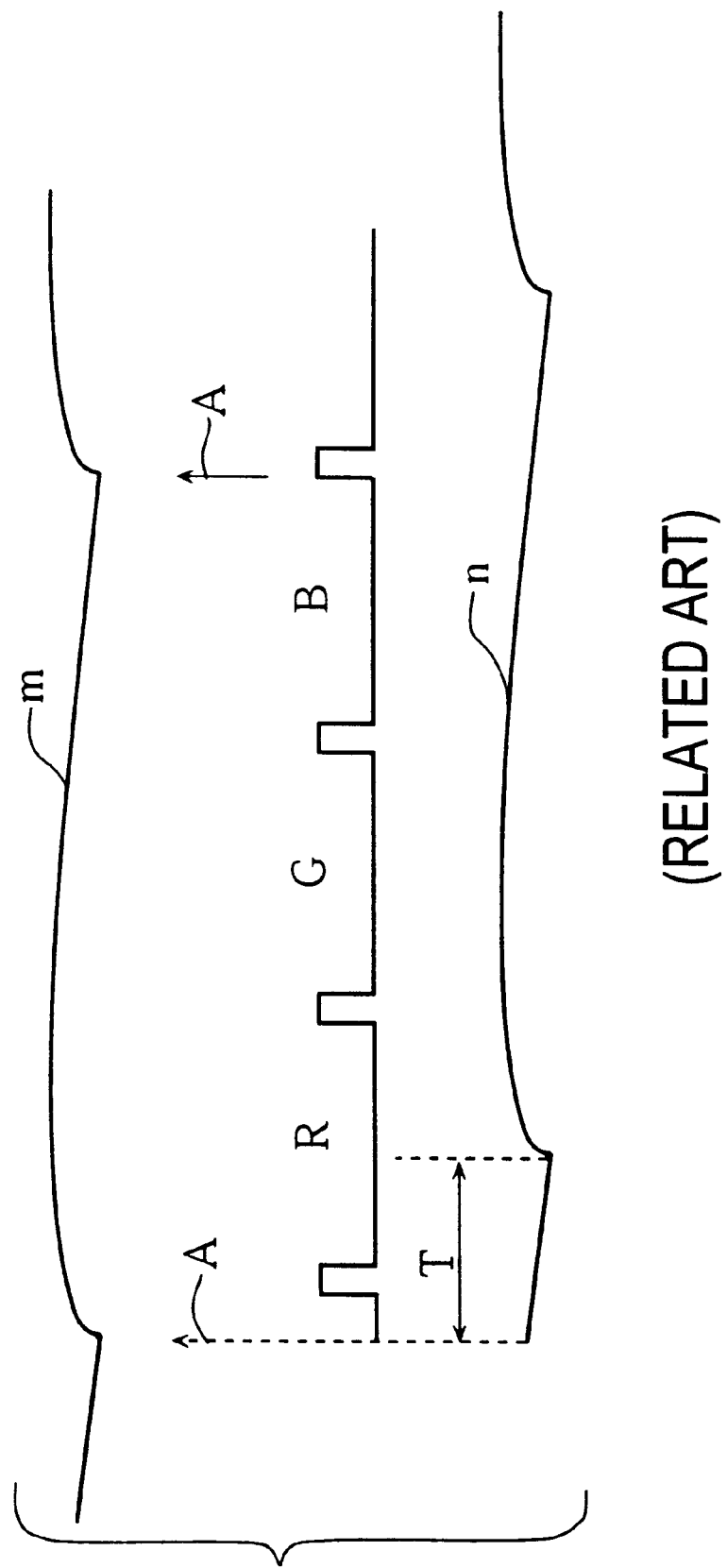

IMAGE READING APPARATUS

BACKGROUND OF THE INVENTION

1. Field of the Invention

The present invention relates to an image reading apparatus for reading out images on an image carrying paper sheet which is moved by a feeding motor. The present invention also relates to a controlling circuit for controlling such a feeding motor.

2. Description of the Related Art:

An image reading apparatus of the above-described type may be incorporated in a facsimile machine for example. As is well known, a facsimile machine incorporates various electronic devices, such as a CPU and a ROM, for controlling the operations of the machine.

The facsimile machine also includes a reading section and a recording section. The reading section is provided to read out images on an image carrying paper and for output of image signals corresponding to the images. To this end, the reading section is provided with a light source for illuminating the image carrying paper, and an image sensor for detecting the reflected light from the image carrying paper. The recording section is provided to print images on a recording paper sheet on the basis of the image signals from the reading section.

Typically, the reading section is provided with a stepping motor for feeding the image carrying paper sheet, and a motor driving unit for controlling the operation of the stepping motor on the basis of phase controlling data supplied by the CPU. When the phase controlling data are input to the motor driving unit, the stepping motor rotates through a predetermined angle.

Referring to FIG. 5, description will now be made to a color image reading procedure of the facsimile machine described above. For reading color images, three image-reading operations, which correspond to red (R), green (G) and blue (B) image signals, are performed for each readout request (A) supplied from the CPU.

Now, it is assumed that the readout request (A) is simultaneous with the input of the phase controlling data to the motor driving unit. In such an instance, the rotational speed of the stepping motor will vary as shown by the curved lines m in FIG. 5. In this case, as can be understood, the feeding amount or displacement of the image carrying paper will not be the same for the above-mentioned three reading operations. More specifically, the displacement of the image carrying paper is the greatest for the red image reading operation since the average speed of the motor is the greatest during the red image reading operation. On the other hand, the displacement of the paper is the smallest for the blue image reading operation since the average speed of the motor is the smallest during this operation. When the displacements of the image carrying paper are not equal for the three reading operations as described above, the image signals obtained by these operations will not represent the original images correctly.

However, the above problem is overcome by delaying the supply of the phase controlling data by a suitable time T with respect to the readout request (A). With such an arrangement, the rotational speed of the stepping motor will vary as shown by the curved lines n in the FIG. 5. As a result, the feeding displacements of the image carrying paper are equalized for the red, green and blue image reading operations.

Conventionally, the delayed supply of the phase controlling data is realized as follows. First, the CPU supplies a readout request (A) while simultaneously actuating a timer by software. Then, when a predetermined time (delay time) of the timer is up, the CPU writes the phase controlling data in the motor driving unit by interruption.

In the conventional method, however, there is a problem of failing to provide the accurate delay time (T) due to the above interruption. Specifically, when utilizing interruption, the interval between the occurrence of the interruption and the time when the CPU actually writes the phase controlling data in the motor driving unit is not always the same. Further, when there is another interruption which should be handled earlier than the interruption in question, the writing of the phase controlling data in the motor driving unit is further postponed.

SUMMARY OF THE INVENTION

It is, therefore, an object of the present invention is to provide an image reading apparatus capable of overcoming the problems described above.

Another object of the present invention is to provide a motor controlling circuit which is advantageously used for such an image reading apparatus.

According to a first aspect of the present invention, there is provided an image reading apparatus for reading out images on an image carrying paper sheet. The image reading apparatus includes: a motor for feeding the image carrying paper sheet; a motor driving unit for driving the motor on a basis of motor controlling data; a motor controlling data generator for generating the motor controlling data; a photoelectric converter for generating image signals corresponding to the images; a register for holding the motor controlling data from the motor controlling data generator; and a delay unit for supplying the motor controlling data held by the register to the motor driving unit after a predetermined delay time.

With such an arrangement, the delayed supply of the motor controlling data to the motor driving unit is advantageously performed by the delay unit. This means that there is no need to utilize interruption for writing the motor controlling data in the motor driving unit. Thus, it is possible to overcome the above-described problem.

The above motor may be a stepping motor.

According to a preferred embodiment, the delay unit may include a latch circuit for holding the motor controlling data from the register, and a counter associated with the latch circuit. The counter may perform counting on a basis of a clock signal. Further, the counter may receive initial value data from the register. In this arrangement, it is possible to vary the delay time in accordance with the initial value data.

The image reading apparatus may further include a readout request signal generator for generating a readout request signal causing the photoelectric converter to start reading the images.

According to a preferred embodiment, the motor controlling data generator and the readout request signal generator may be provided by a CPU.

The above-described image reading apparatus may be incorporated in a facsimile machine for example.

According to a second aspect of the present invention, there is provided a motor controlling circuit for controlling a motor driven in accordance with motor controlling data. The motor controlling circuit includes: a register for holding the motor controlling data; a motor driving unit for actuating the motor on a basis of the motor controlling data from the register; and a delay unit for supplying the motor controlling data held by the register to the motor driving unit after a predetermined delay time.

Other objects, features and advantages of the present invention will be apparent from the detailed description of the embodiment given below with reference to the accompanying drawings.

BRIEF DESCRIPTION OF THE DRAWINGS

In the accompanying drawings:

FIG. 5. illustrates a relation between motor speed and image reading operations.

DETAILED DESCRIPTION OF THE PREFERRED EMBODIMENT

The preferred embodiment of the present invention will be described below with reference to the accompanying drawings.

Figure 1:
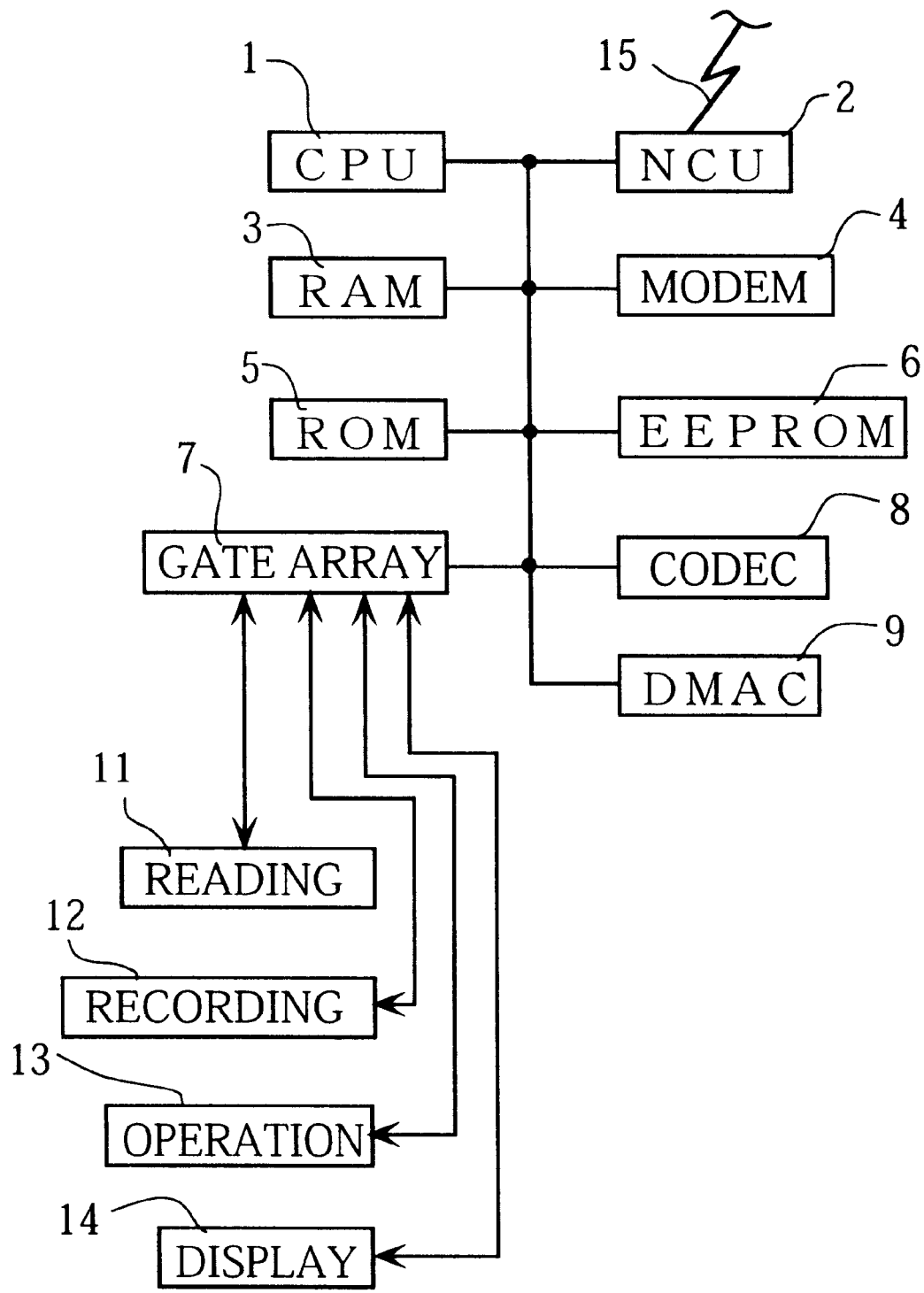
FIG. 1 is a block diagram showing a facsimile machine which incorporates an image reading apparatus according to an embodiment of the present invention.

Reference is first made to FIG. 1 which is a circuit block diagram showing a principal portion of a facsimile machine incorporating an image reading apparatus according to the present invention. This facsimile machine comprises a CPU (central processing unit) 1, an NCU (network control unit) 2, a RAM (random access memory) 3, a modem (modulator-demodulator) 4, a ROM (read-only memory) 5, an EEPROM (electrically erasable and programmable ROM) 6, a gate array 7, a codec (coder-decoder) 8, and a DMAC (direct memory access controller) 9. Further, the facsimile machine also comprises a reading section 11, a recording section 12, an operation section 13, and a display section 14.

The CPU 1, the NCU 2, the RAM 3, the modem 4, the ROM 5, the EEPROM 6, the gate array 7, the codec 8 and the DMAC 9 are connected to each other via bus lines. The bus lines include data bus lines, address bus lines and control signal bus lines. The gate array 7 is connected to the reading section 11, the recording section 12, the operation section 13 and the display section 14, respectively. The NCU 2 is connected to a telephone line 15.

Figure 2:
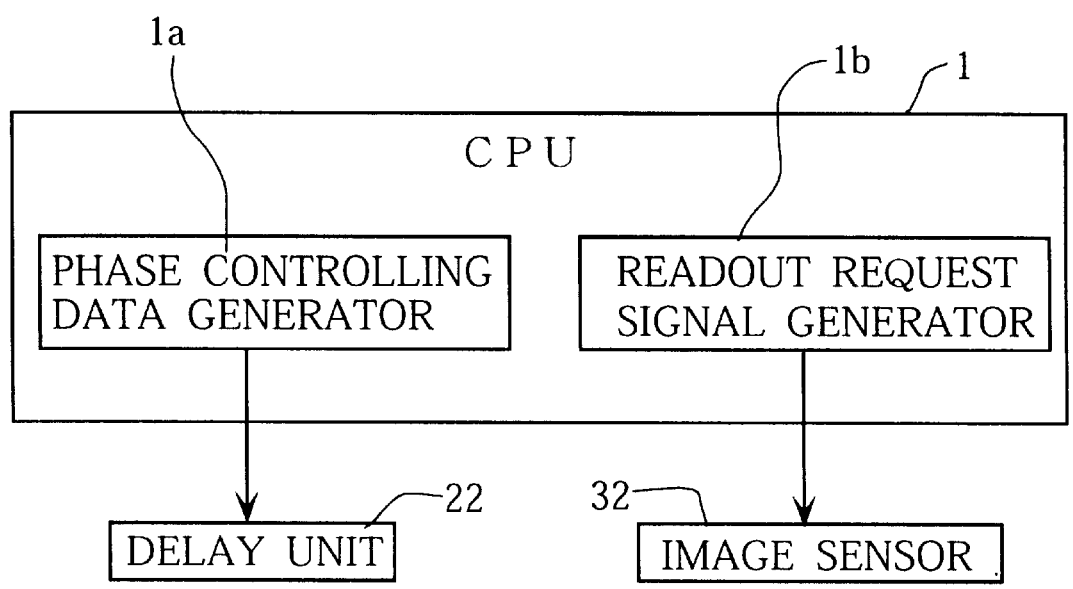
FIG. 2 is a block diagram showing an arrangement of a CPU which is advantageously used for the facsimile machine illustrated in FIG. 1.

The CPU 1 provides an overall control of the facsimile machine. As will be described hereinafter in detail, the CPU 1 includes a phase controlling data generator 1a and a readout request signal generator 1b (FIG. 2).

The NCU 2 is connected to the telephone line 15 for providing network control. The NCU 2 is also connected to the modem 4.

The RAM 3 stores various data such as image data for example. Of course, an additional RAM or RAMs may be provided to increase the capacity of data storage.

The modem 4 modulates the transmitting codes and demodulates t he received codes.

The ROM 5 stores various programs, initial value data or the like as required for controlling the facsimile machine, whereas the EEPROM 6 stores registered data (e.g. shortcut dials) and/or various flags.

The gate array 7 functions as an I/O interface (input/output interface) for the CPU 1 for data transmission to and/or from the reading section 11, the recording section 12, the operation section 13 and the display section 14. The gate array 7 also performs various kinds of processing for e.g., image signals from the reading section 11.

The codec 8 performs coding of the transmitting image data and decoding of the received image data, for example.

The DMAC 9 provides memory access control with respect to the RAM 3 for example.

The reading section 11 includes an image reading apparatus for reading out images on an image carrying paper sheet (not shown) and supplying image signals corresponding to the images.

The recording section 12 performs printing of images on a recording paper sheet (not shown) on the basis of the image data received through the gate array 7. The recording section may be provided with an inkjet printer for example.

The operation section 13 has key switches to be operated by the user for output of operation signals, whereas the display section 14 includes an LCD (liquid crystal display) or the like for providing various indications under the control of the CPU 1.

Figure 3:
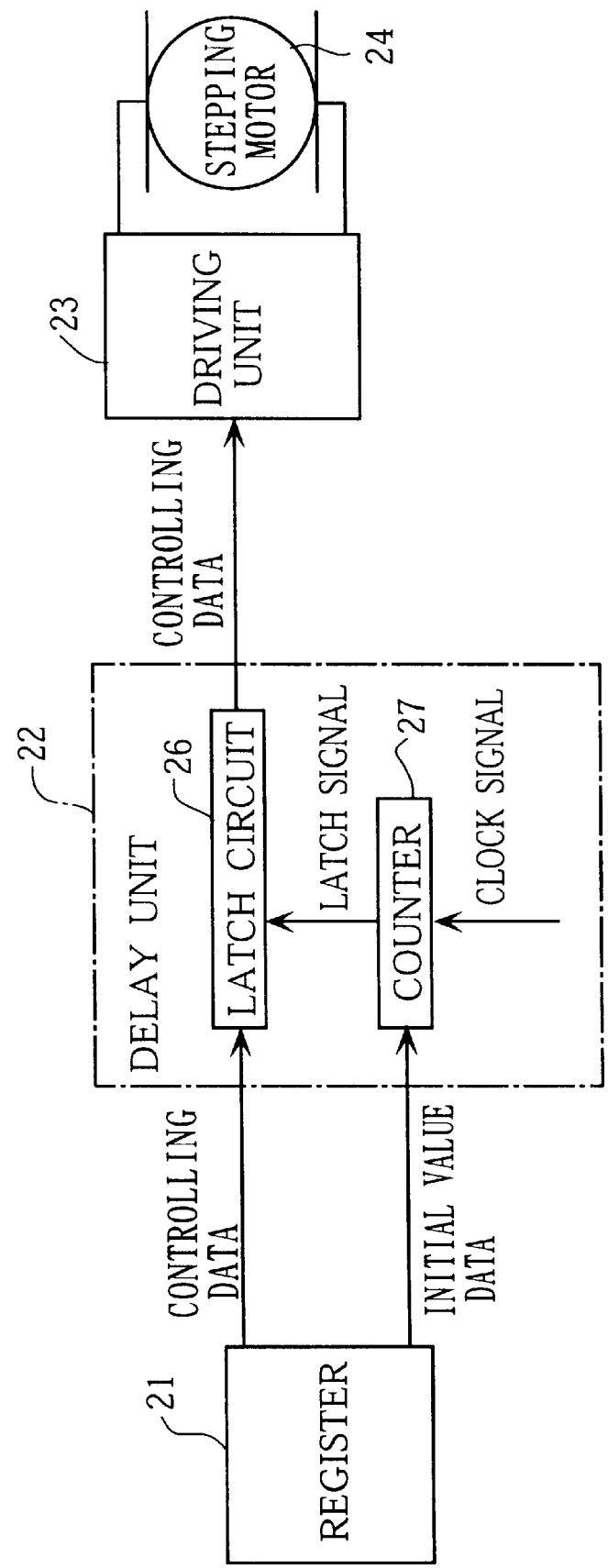
FIG. 3 is a block diagram showing a feeding section of the image reading apparatus.

FIG. 3 is a circuit block diagram showing a paper-feeding section of the reading section 11. The feeding section includes a register 21, a delay unit 22, a motor driving unit 23, and a suitable feeding motor 24 for moving an image carrying paper sheet. Preferably, the motor is a stepping motor. The delay unit 22 includes a latch circuit 26 and a counter 27. In the specification, a combination of the register 21, the delay unit 22 and the motor driving unit 23 is referred to as a "motor controlling circuit."

The register 21 holds phase controlling data (which may be 4-bit data for example) provided by CPU 1 by way of the gate array 7. The register 21 also holds initial value data to be supplied to the counter 27. Via the register 21, the phase controlling data are supplied to the latch circuit 26 of the delay unit 22, while the initial value data are supplied to the counter 27. The delay unit 22 is arranged to transmit the phase controlling data from the register 21 to the motor driving unit 23 after a delay time which is variable in accordance with the initial value data supplied to the counter 27.

The motor driving unit 23 supplies driving currents to the feeding motor 24 on the basis of the phase controlling data from the delay unit 22. Accordingly, the motor 24 is actuated to feed an image carrying paper sheet successively.

The latch circuit 26 may include four (4) D flip-flops. In accordance with latch signals from the counter 27, the latch circuit 26 holds the phase controlling data transmitted from the register 21 and then supplies the data to the motor driving unit 23. In the counter 27, an initial value is set on the basis of the initial value data from the register 21. Thereafter, the counter 27 counts pulses of a clock signal. The clock signal may be generated by a system clock incorporated in the facsimile machine. When a carry occurs during the counting operation, the counter 27 supplies the latch signal to the latch circuit 26, while also loading the initial value data stored in the register 21.

Figure 4:
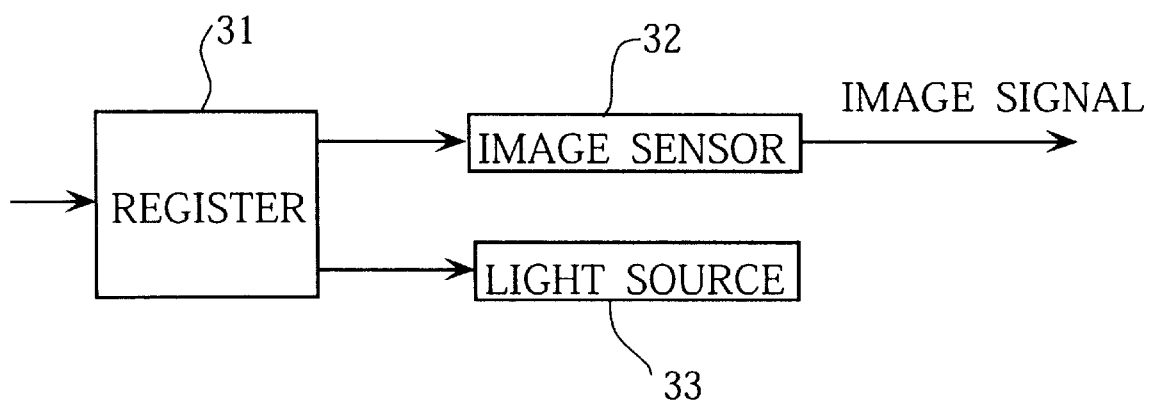
FIG. 4 is a block diagram showing a reading section of the image reading apparatus.

FIG. 4 is a circuit block diagram showing an image signal generator of the reading section 11. The image signal generator includes a register 31, an image sensor 32 such as a CCD image sensor and the like, and a light source 33 which may include LEDs for example. The register 31 holds readout request flags supplied by the CPU 1 by way of the gate array 7, and also holds light-up request flags. Then, the register 31 supplies the readout request flag to the image sensor 32, while supplying the light-up request flag to the light source 33. Upon input of the light-up request flag, the light source starts to emit light having predetermined luminous energy for illuminating the image carrying paper sheet. The image sensor 32, upon input of the readout request flag, produces analog image signals in accordance with the luminous energy of light coming from the image carrying paper and received by the image sensor 32.

Description will now be made to the operation of a facsimile machine having the arrangement described above.

It is now assumed that the facsimile machine is in the copy mode or the facsimile transmission mode. In this mode, when an image carrying paper is moved to a predetermined starting position by the feeding motor 24, the CPU 1 supplies the light-up request flag to a predetermined area of the register 31 of the reading section 11. The register 31 holds the light-up request flag, and supplies it to the light source 33. As a result, the light source starts illuminating the image carrying paper. The reflected light from the image carrying paper is received by the light receiving elements of the image sensor 32.

On the other hand, the CPU 1 generates phase controlling data by motor timer interruption which occurs at predetermined intervals. The CPU 1 supplies the phase controlling data to a predetermined area of the register 21 by way of the gate array 7. Further, the CPU 1 reads out the initial value data stored in the ROM 5, and supplies the initial value data to a predetermined area of the register 21 by way of the gate array 7. As a result, the counter 27 counts the pulses of a clock signal having a predetermined cycle while referring to the initial value determined in accordance with the initial value data. Upon occurrence of a carry during the counting procedure, the counter 27 sends a latch signal to the latch circuit 26. As a result, the latch circuit 26 holds the phase controlling data from the register 21, and then supplies the data to the motor driving unit 23. On the basis of the phase controlling data, the motor driving unit 23 supplies driving currents to the feeding motor 24. As a result, the motor 24 is actuated to rotate through a predetermined angle, so that the image carrying paper is moved forward by a predetermined distance.

After supplying the phase controlling data and initial value data to the register 21 in the manner described above, the CPU 1 supplies the readout request flag to a predetermined area of the register 31 of the reading section 11. The register 31 holds the readout request flag, and then supplies the flag to the image sensor 32. As a result, the image sensor 32 outputs analog image signals (corresponding to the picture elements) in accordance with the luminous energy of the received light. The image signals are sent to the gate array 7 to be converted into digital image data. Thereafter, the digital image data are subjected to various processing procedures.

The above-described operation is repeated at predetermined intervals by the motor timer interruption. Thus, the images on the carrying paper sheet are read out while the sheet is advancing. When the facsimile machine is in the copy mode, the digital image data processed at the gate array 7 are sent to the recording section 12 for performing printing on a recording paper sheet. When the machine is in the facsimile transmission mode, the processed image data are sent to the codec 8 to be coded. Then, the coded data are modulated by the modem 4 to be transmitted via the NCU 2 to the telephone line 15.

According to the present invention, the timing of the writing of the phase controlling data in the motor driving unit 23 is adjusted by the delay time determined by the delay unit 22, as described hereinbefore. Thus, it is possible to overcome the problems accompanied by the interruption in the conventional facsimile machine.

In the above embodiment, the image reading apparatus is described as being incorporated in a facsimile machine. However, this is not limitative. An image reading apparatus according to the present invention may be used in an image scanner, a copier or any other device performing image reading operation.

The present invention being thus described, it is obvious that the same may be varied in many ways. Such variations should not be regarded as a departure from the spirit and scope of the present invention, and all such modifications as would be obvious to those skilled in the art are intended to be included within the scope of the following claims.

What is claimed is:

1. An image reading apparatus for reading out images on an image carrying paper sheet comprising:
    a motor for feeding the image carrying paper sheet;
    a motor driving unit for driving the motor on a basis of original motor controlling data;
    a motor controlling data generator for generating the original motor controlling data;
    a photoelectric converter for generating image signals corresponding to the images;
    a register for holding the original motor controlling data from the motor controlling data generator; and
    a delay unit for supplying the original motor controlling data held by the register to the motor driving unit after a predetermined delay time.

2. The image reading apparatus according to claim 1, wherein the motor is a stepping motor.

3. The image reading apparatus according to claim 1, wherein the delay unit includes a latch circuit for holding the original motor controlling data from the register, and a counter associated with the latch circuit.

4. The image reading apparatus according to claim 3, wherein the counter performs counting on a basis of a clock signal.

5. The image reading apparatus according to claim 3, wherein the counter receives initial value data from the register, the delay time being variable in accordance with the initial value data.

6. The image reading apparatus according to claim 1, further comprising a readout request signal generator for generating a readout request signal causing the photoelectric converter to start reading the images.

7. The image reading apparatus according to claim 6, wherein the motor controlling data generator and the readout request signal generator are provided by a CPU.

8. The image reading apparatus according to claim 1, wherein the image reading apparatus is incorporated in a facsimile machine.

9. A motor controlling circuit for controlling a motor driven in accordance with original motor controlling data comprising:
    a register for holding the motor controlling data;
    a motor driving unit for actuating the motor on a basis of the original motor controlling data from the register; and
    a delay unit for supplying the original motor controlling data held by the register to the motor driving unit after a predetermined delay time.

10. The motor controlling circuit according to claim 9, wherein the delay unit includes a latch circuit for holding the original motor controlling data from the register, and a counter associated with the latch circuit.

11. The motor controlling circuit according to claim 10, wherein the counter performs counting on a basis of a clock signal.

12. The motor controlling circuit according to claim 11, wherein the counter receives initial value data from the register, the delay time being variable in accordance with the initial value data.

13. An image reading apparatus for reading out images on an image carrying paper sheet comprising:

a motor for feeding the image carrying paper sheet;

a motor driving unit for driving the motor on a basis of original motor controlling data;

a motor controlling data generator for generating the original motor controlling data;

a photoelectric converter for generating image signals corresponding to the images;

a register for holding the original motor controlling data from the motor controlling data generator; and a delay unit for supplying the original motor controlling data held by the register to the motor driving unit after a predetermined delay time;

wherein the delay unit includes a latch circuit for holding the original motor controlling data from the register, and a counter associated with the latch circuit for supplying a latch signal and initial value data to the latch circuit, the delay time being variable in accordance with the initial value data.

14. A motor controlling circuit for controlling a motor driven in accordance with original motor controlling data comprising:

a register for holding the original motor controlling data;

a motor driving unit for actuating the motor on a basis of the original motor controlling data from the register; and a delay unit for supplying the original motor controlling data held by the register to the motor driving unit after a predetermined delay time;

wherein the delay unit includes a latch circuit for holding the original motor controlling data from the register, and a counter associated with the latch circuit for supplying a latch signal and initial value data to the latch circuit, the delay time being variable in accordance with the initial value data.

* * * * *